June 30, 1953    A. C. SHILL    2,643,697
ANTISKID OR TRACTION DEVICE
Filed May 28, 1952
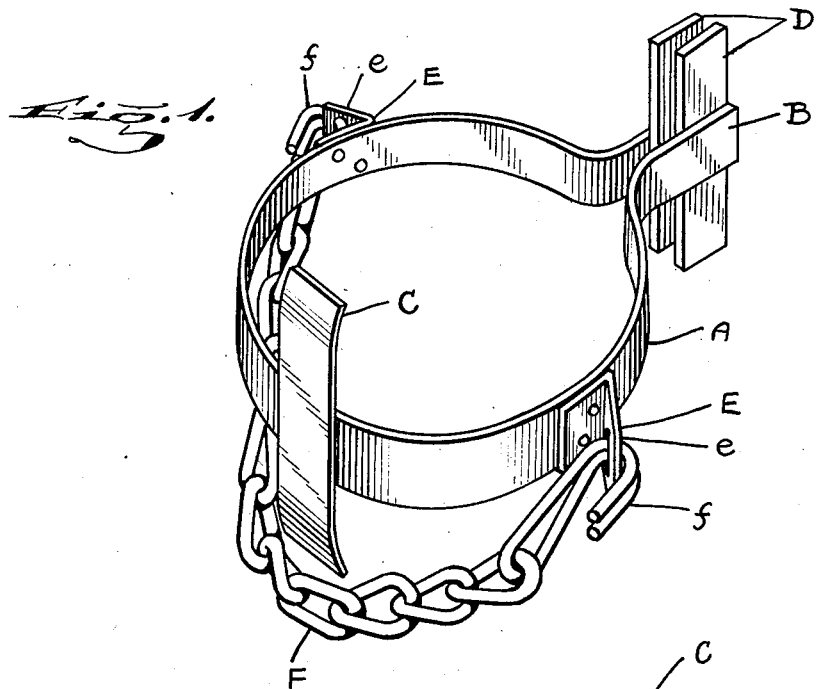
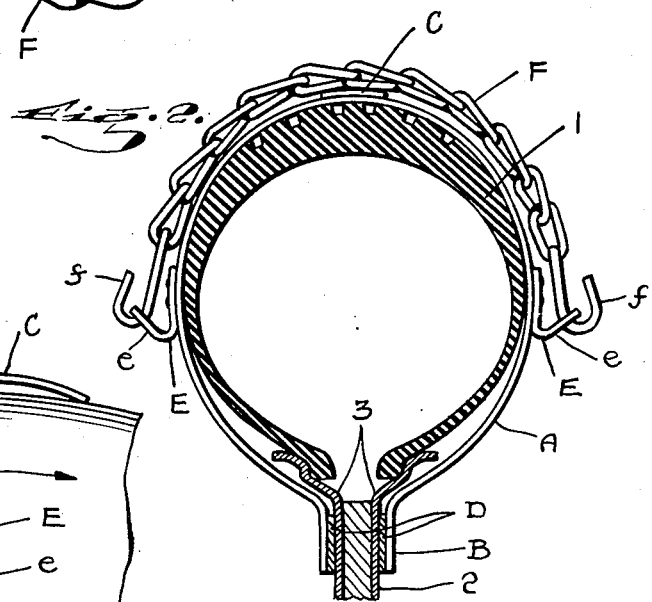
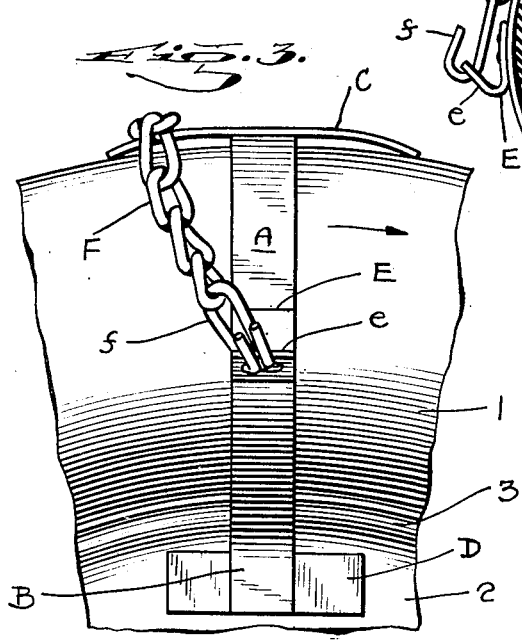
INVENTOR
ALEXANDER C. SHILL
BY
John E. Hubbell
ATTORNEY Patented June 30, 1953

2,643,697

UNITED STATES PATENT OFFICE 2,643,697

ANTISKID OR TRACTION DEVICE

Alexander C. Shill, New York, N. Y.

Application May 28, 1952, Serial No. 290,508

3 Claims. (Cl. 152—224)

The general object of the present invention is to provide an anti-skid or traction device of novel construction for detachable connection to a vehicle wheel and particularly an automobile wheel.

More specifically, the object of the invention is to provide an anti-skid device comprising a spring steel strip bent to encircle the tire and rim portion of the wheel, and arranged to be sprung about said tire and rim portion of the wheel with the ends of the strip bearing against the wheel disc or wheel body portion. The device also includes a chain extending over the crown or tread of the tire and having its ends connected to side portions of the circular strip. My anti-skid device is of simple and relatively inexpensive construction and may be so formed that it can be readily attached to, and detached from an automobile wheel by any individual having the bodily strength possessed by any normal woman able to drive an automobile.

The invention is of especial utility in moving a stalled vehicle out of a snow bank, mud hole or the like, in which the drive wheels, with no traction device applied thereto, turn without developing effective traction force. In such case, the application of one or more of my traction devices to each drive wheel or in some cases to one drive wheel only, will enable the vehicle to develop the needed traction force.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Of the drawings:

Fig. 1 is a perspective view of an anti-skid device;

Fig. 2 is a cross section through the outer portion of a vehicle wheel on which the device shown in Fig. 1 is attached; and Fig. 3 is a side elevation of the portion of the wheel shown in Fig. 2.

In its preferred form illustrated in the drawings, my novel anti-skid or traction device comprises a strip A of tempered steel or analogous metal bent into approximately circular form to fit about the tire 1 and rim portion 3 of the wheel of an automobile or other vehicle wheel. The strip A has end portions B bearing against the opposite sides of the wheel disc 2. As shown, the wheel tire and rim portion comprises a tire casing with inner edge portions gripped by the usual metallic rim part 3 which is surrounded by, and is interlocked with the tire. A metal bar C is welded to the central portion of the strip A and has its end portions extending transversely to the strip and bent to fit snugly against the tire casing tread at a distance from each side of the strip A.

As shown, the end portions B of the strip A are in gripping engagement with the sides of the wheel disc 2 adjacent the periphery of the latter. To increase the effective contact surface area engaged by the end portions B, transverse bars D are advantageously welded or otherwise attached to each end portion B. As shown, the bars D extend transversely to the strip end portions B away from each side edge thereof and bear directly against the wheel disc. Preferably the bars D are interposed between the wheel disc 2 and the strip end portions B.

The opposite sides of the curved strip A are provided with means E for attaching the ends of an anti-skid chain F to the strip A at a point nearer to its end portion B than to the apex of the crown portion of the strip. As shown, each means E is a bracket-like part secured to the adjacent portion of the strip A as by welding or riveting, and includes a portion adjacent the strip A and a portion $e$ extending away from the strip A and formed with a perforation to receive the corresponding hook end $f$ of the chain F.

Each bracket E is thus loosely connected to the corresponding hook end portion $f$ of the chain F. The length of the chain including its end portions $f$ is slightly greater than that required to extend over the tread of the tire, and in operation, the chain F trails the strip A to which it is attached, generally as shown in Fig. 3. The chain F is shown as having the general form and link dimensions of anti-skid chains commonly used on automobile wheels of the same general size and load capacity. In practice, two or more anti-skid members A, of the kind illustrated, are advantageously applied to an automobile wheel, though a single device applied to one or two automobile driving wheels may well be sufficient to move an automobile out of a mud hole or snow bank in which the wheels would otherwise rotate without producing a significant traction effect.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. A traction device for detachable connection to a vehicle wheel comprising a disc having a rim and a tire mounted thereon, wherein the tire is of relatively large cross sectional area and the disc is relatively narrow, said device comprising a strip of spring metal bent to fit about the tire and rim and having juxtaposed end portions and lateral transverse extensions on said end portions arranged to bear directly against the opposite sides of said disc and having other lateral extensions from a central portion of said strip arranged to bear against the tread of said tire at points displaced from said strip, and a chain having its ends connected to said strip at points at the opposite side of said tire, said chain being of such length that the portion thereof engaging the tread of the tire may trail slightly behind the portion of said strip adjacent the portion of the tread.

2. A traction device as specified in claim 1, in which said other lateral extensions are bent to form a concave bearing surface adapted to engage a peripheral portion of the tire tread of substantially greater length than the width of said strip.

3. A traction device as specified in claim 1, in which the lateral extensions bearing against each side of said disc are formed by end portions of a metal bar connected to one another by an integral portion of said bar at the inner side of and rigidly connected to the adjacent portion of said strip.

ALEXANDER C. SHILL.

References Cited in the file of this patent

UNITED STATES PATENTS

| Number | Name | Date |
| --- | --- | --- |
| 1,255,534 | Hons | Feb. 5, 1918 |
| 2,440,863 | Liggio | May 4, 1948 |
| 2,457,208 | Carpenter | Dec. 28, 1948 |
| 2,464,564 | Dunner | Mar. 15, 1949 |